United States Patent
Mody

(10) Patent No.: US 10,541,714 B2
(45) Date of Patent: Jan. 21, 2020

(54) CASE WITH MULTI-LAYER ENCAPSULATION OF DESIGN ELEMENTS

(71) Applicant: CASE-MATE, INC., Atlanta, GA (US)

(72) Inventor: Saumil Chetan Mody, Smyrna, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 16/136,009

(22) Filed: Sep. 19, 2018

(65) Prior Publication Data

US 2019/0089394 A1 Mar. 21, 2019

Related U.S. Application Data

(60) Provisional application No. 62/560,811, filed on Sep. 20, 2017.

(51) Int. Cl.
| | |
|---|---|
| *H04B 1/3888* | (2015.01) |
| *A45C 11/00* | (2006.01) |
| *H04M 1/18* | (2006.01) |

(52) U.S. Cl.
CPC ............ *H04B 1/3888* (2013.01); *A45C 11/00* (2013.01); *A45C 2011/002* (2013.01); *H04M 1/185* (2013.01)

(58) Field of Classification Search
CPC ............ H04M 1/0252; H04M 1/0264; H04M 1/0277; H04M 1/0283; H04M 1/185; H04M 1/72527; A45C 2011/002; A45C 11/00; H04B 1/3888
See application file for complete search history.

(56) References Cited

U.S. PATENT DOCUMENTS

| 9,451,066 B1* | 9/2016 | Jia .................... H04M 1/0283 |
|---|---|---|
| 2010/0045538 A1* | 2/2010 | East ................... H05K 9/0077 343/702 |
| 2013/0175186 A1* | 7/2013 | Simmer ............... G06F 1/1626 206/37 |
| 2014/0028162 A1* | 1/2014 | Carlson ............... H04M 1/0283 312/223.1 |

(Continued)

OTHER PUBLICATIONS

TVCMall, archived on Jul. 23, 2017 (retrieved from https://web.archive.org/web/20170723043311/https://www.tvc-mall.com/details/patterned-tpu-protective-cell-phone-case-with-finger-grip-ring-for-huawei-p10-lite-flowers-pattern-sku10174431h.html) (Year: 2017).*

*Primary Examiner* — Daniel Lai
(74) *Attorney, Agent, or Firm* — Gardner Groff & Greenwald, PC

(57) ABSTRACT

A case with multi-layer encapsulation of design elements. The case generally comprises a shell including a back panel which incorporates design elements encapsulated in a plurality of layers. Each layer comprises a different design element or a different configuration of design elements. And a method of encapsulation of two or more layers of design elements into a product, including the steps of mixing decorative design elements with a liquid epoxy monomer to form a mixture; adding a hardening agent or catalyst to the mixture; pouring the mixture into a cavity on a case or cover; allowing the mixture to harden to form a cured first layer; applying another layer of epoxy over the cured first layer; arranging decorative design elements onto the uncured layer of epoxy; applying another layer of epoxy over the decorative design elements, and allowing that layer to cure.

12 Claims, 5 Drawing Sheets

(56) References Cited

U.S. PATENT DOCUMENTS

| | | | | |
|---|---|---|---|---|
| 2014/0184669 A1* | 7/2014 | Oh | ............... | G09G 3/3208 |
| | | | | 345/694 |
| 2015/0111623 A1* | 4/2015 | Hegemier | ........... | H04M 1/0283 |
| | | | | 455/575.1 |
| 2015/0195938 A1* | 7/2015 | Witter | ............... | H05K 5/03 |
| | | | | 206/521 |
| 2017/0049000 A1* | 2/2017 | Kang | ............... | A45C 11/00 |
| 2018/0359343 A1* | 12/2018 | Lee | ............... | H04B 1/3888 |

* cited by examiner

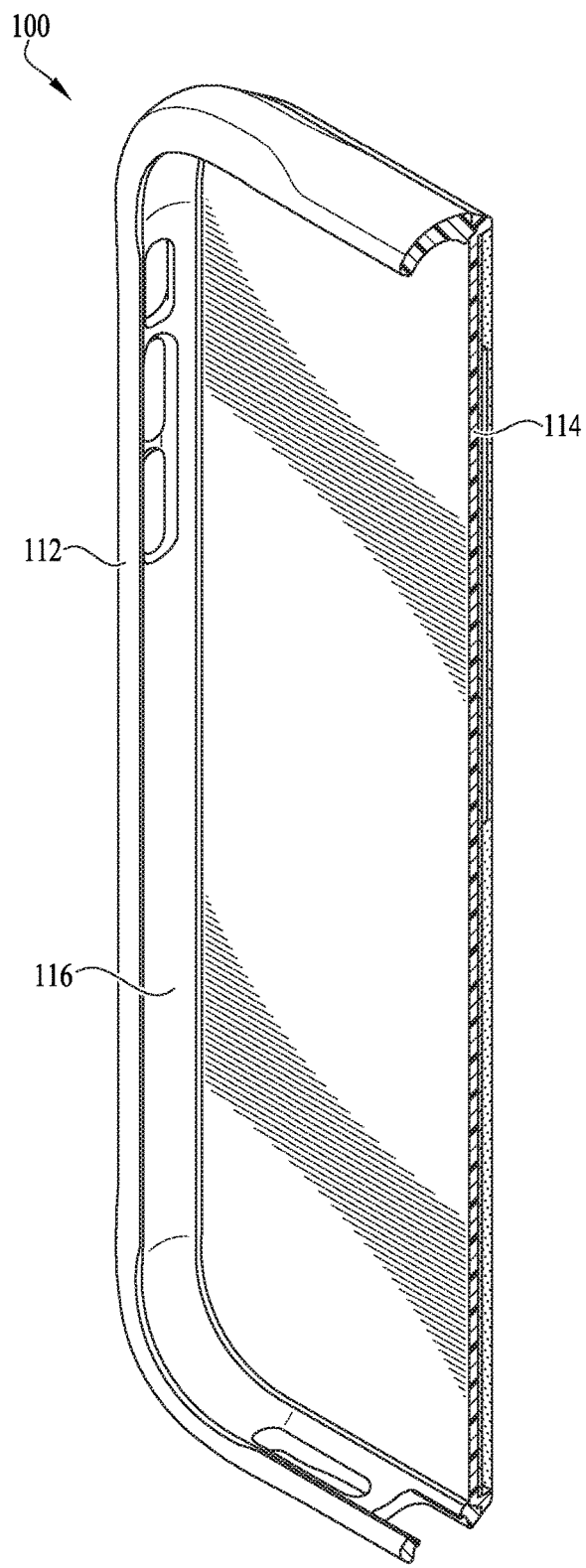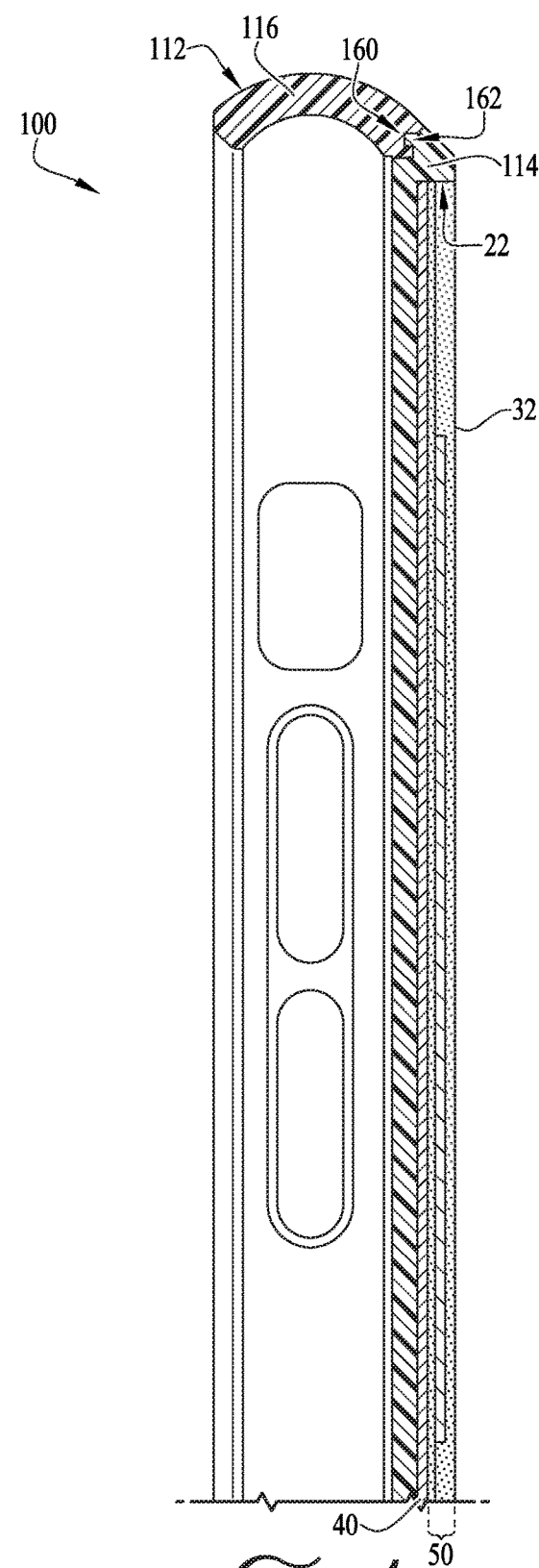

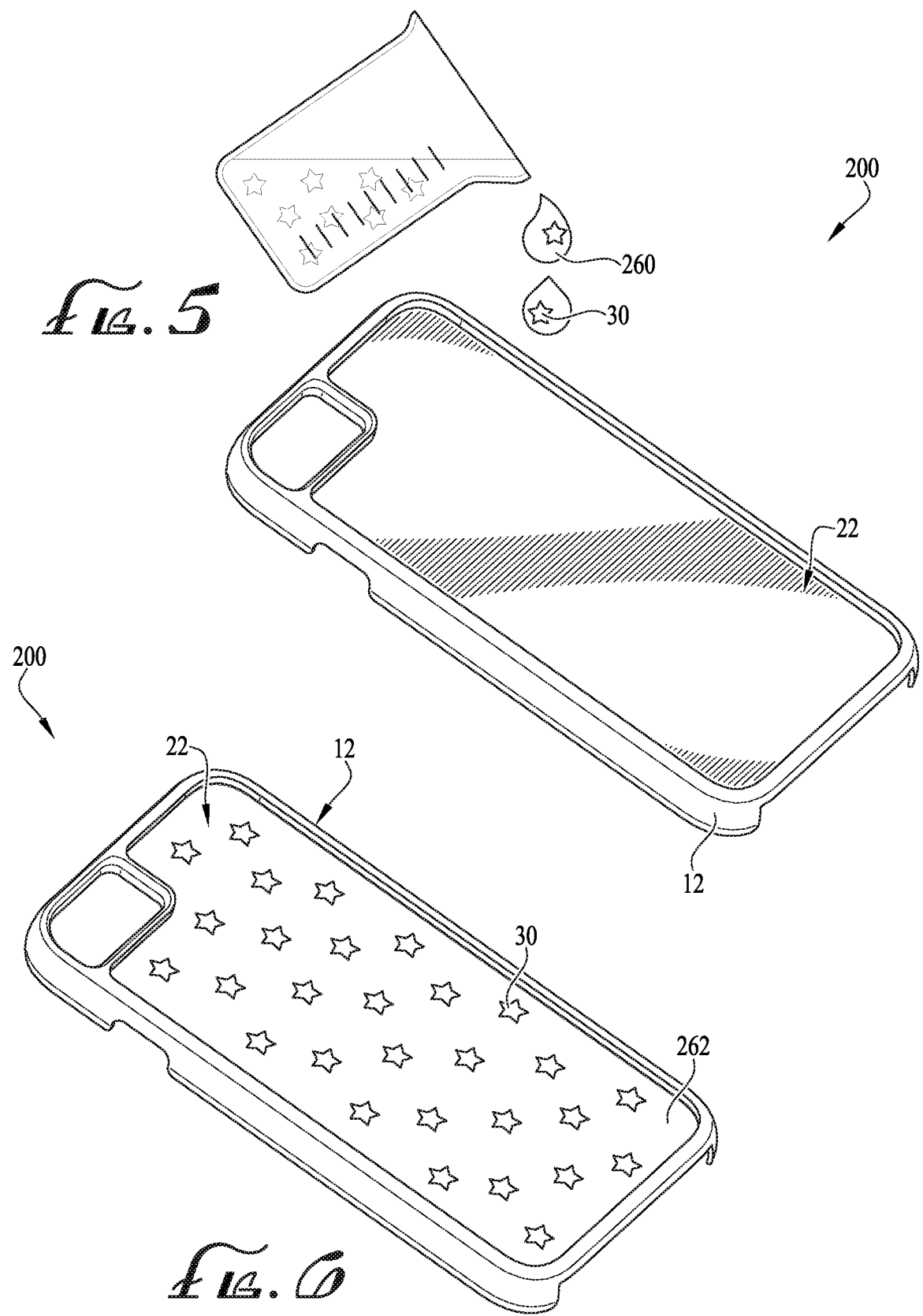

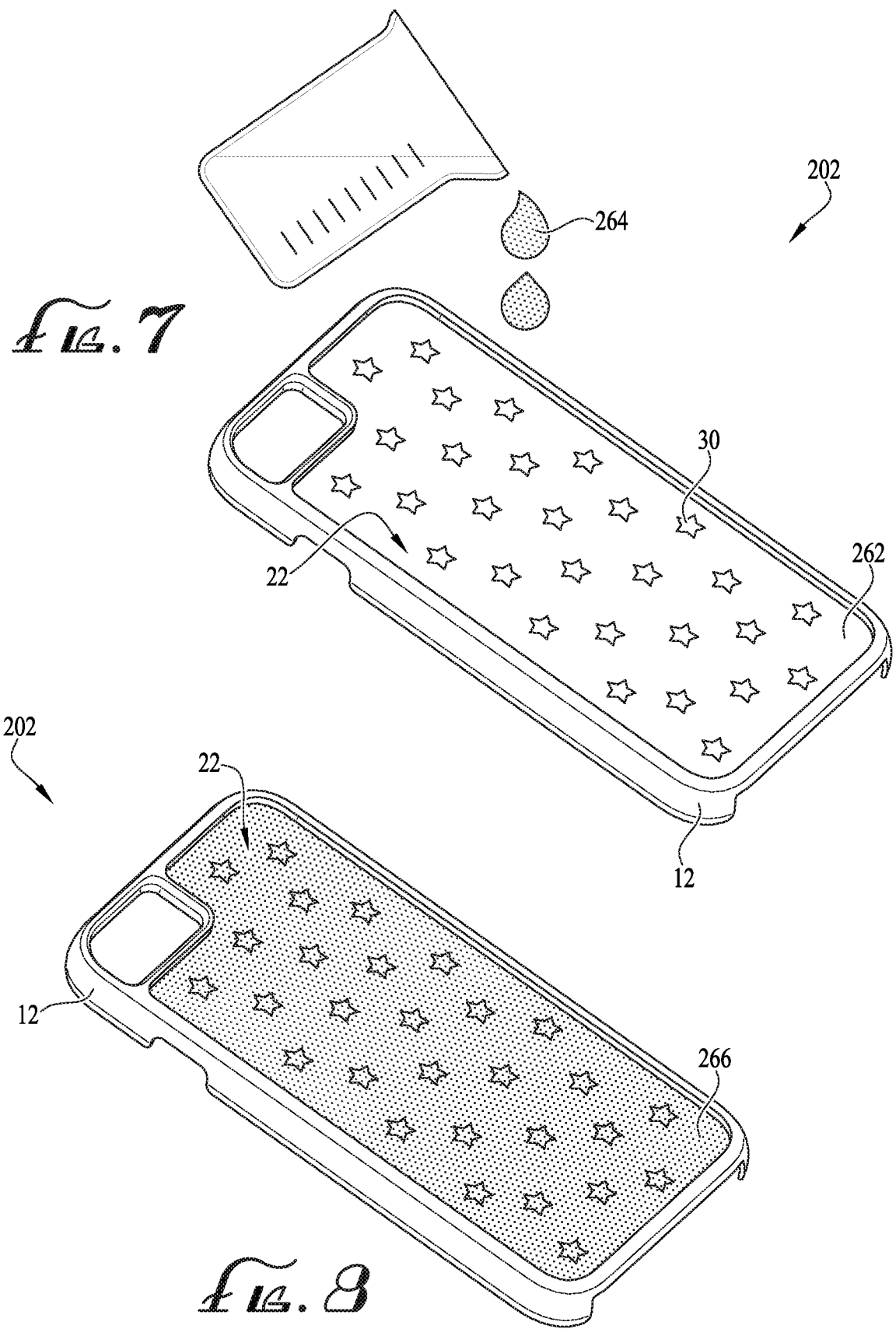

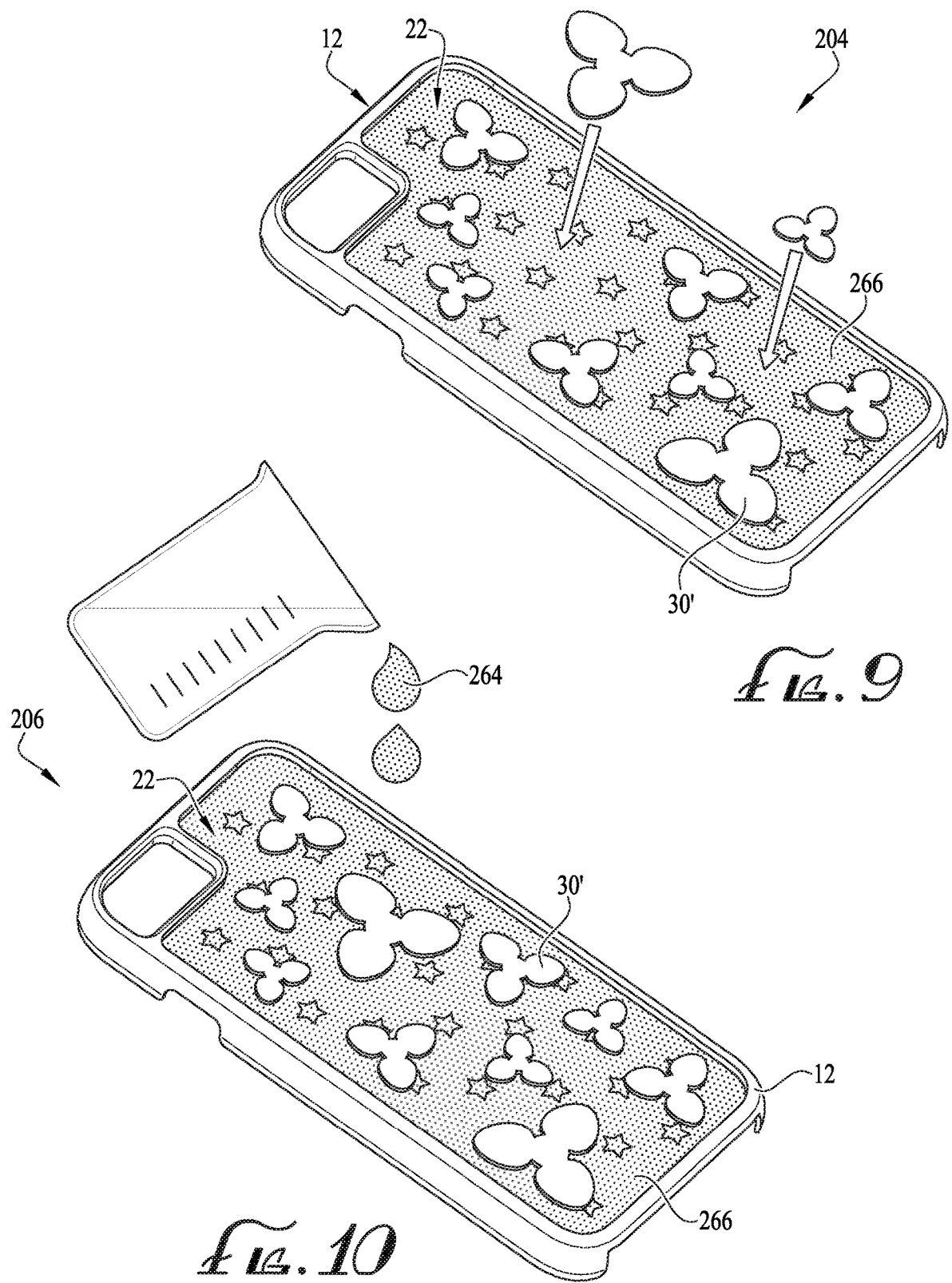

CASE WITH MULTI-LAYER ENCAPSULATION OF DESIGN ELEMENTS

CROSS-REFERENCE TO RELATED APPLICATIONS

This application claims the benefit of U.S. Provisional Patent Application Ser. No. 62/560,811 filed Sep. 20, 2017, the entirety of which is hereby incorporated herein by reference for all purposes.

TECHNICAL FIELD

The present invention relates generally to the field of protective cases or covers for cell phones and other electronic devices, and more particularly to cases including multiple layers of encapsulated decorative design elements and methods of manufacturing said cases.

BACKGROUND

Cases are commonly utilized in connection with smartphones, tablet computers, and other electronic devices, to protect the electronic device from damage and/or for ornamentation and style. Continuing improvements in the field are sought. It is to the provision of cases for electronic devices meeting these and other needs that the present invention is primarily directed.

SUMMARY

In example embodiments, the present invention provides a case with multi-layer encapsulation of design elements. The case generally comprises a shell including a back panel which incorporates design elements encapsulated in a plurality of layers. Each layer comprises a different design element or a different configuration of design elements.

In example embodiments, the present invention provides manufacturing methods for cases or covers for electronic devices, the methods including encapsulation of layers of two or more types of decorative design elements into the case. In further example embodiments, the invention provides cases or covers for electronic devices manufactured by such methods.

In example embodiments, the present invention provides a method of encapsulation of two or more layers of design elements into a product, including the steps of mixing decorative design elements with a liquid epoxy monomer to form a mixture; adding a hardening agent or catalyst to the mixture; pouring the mixture into a cavity on a case or cover; allowing the mixture to harden to form a cured first layer; applying another layer of epoxy over the cured first layer; arranging decorative design elements onto the uncured layer of epoxy; applying another layer of epoxy over the decorative design elements, and allowing that layer to cure.

In one aspect, the present invention relates to a case comprising a case shell having at least one recess. The recess comprises a first layer of material encapsulating design elements of a first type and a second layer of translucent or transparent material encapsulating design elements of a second type. The second layer is positioned to the outside of and substantially covers the first layer. In example embodiments, the design elements of the first type and the design elements of the second type are visible on an exterior surface of the case.

In another aspect, the invention relates to a case for an electronic device comprising a resilient, flexible frame configured to extend around an outer periphery of the device and a rigid back panel configured to cover a back portion of the device. The back panel has a front, interior surface and a back, exterior surface. The exterior surface of the back panel has at least one recess comprising a first layer of translucent or transparent material encapsulating a design element of a first type and a second layer of translucent or transparent material encapsulating a design element of a second type. The second layer is positioned outside of and substantially covers the first layer.

In another aspect, the invention relates to a case for an electronic device, the case including a plastic shell and at least two layers of decorative design elements encapsulated thereon and visible on an exterior surface of the case.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 3 is a cut-away perspective view of a case with multi-layer encapsulation of design elements according to another example embodiment of the present invention.

FIG. 4 is a cross-sectional side view of the case of FIG. 3.

FIG. 5 shows a step of a manufacturing process for producing an electronic device case having a multi-layer encapsulation of design elements, according to an example embodiment of the invention.

FIG. 6 shows an additional step of the manufacturing process of FIG. 5.

FIG. 7 shows an additional step of the manufacturing process of FIG. 5.

FIG. 8 shows an additional step of the manufacturing process of FIG. 5.

FIG. 9 shows an additional step of the manufacturing process of FIG. 5.

FIG. 10 shows an additional step of the manufacturing process of FIG. 5.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
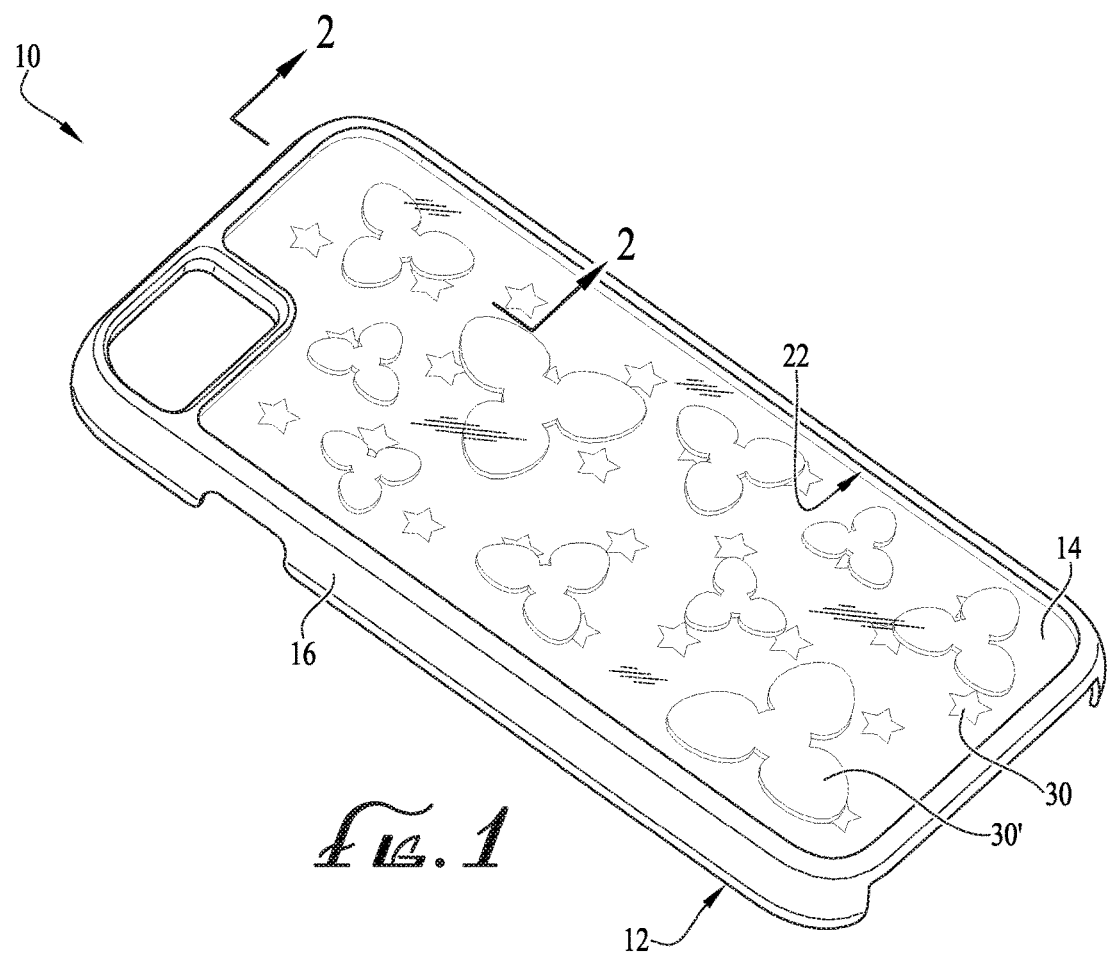
FIG. 1 is a perspective view of a case with multi-layer encapsulation of design elements according to an example embodiment of the present invention.
Figure 2:
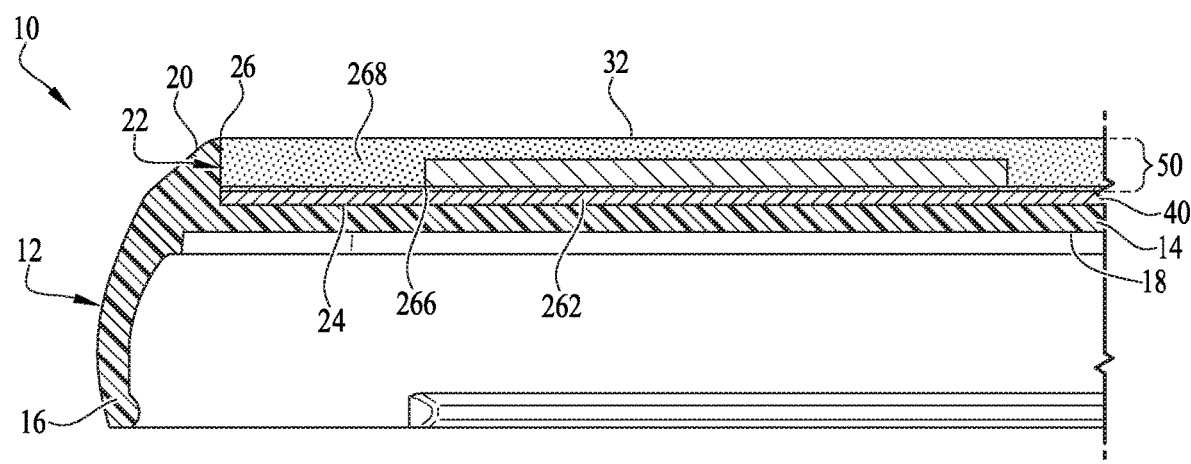
FIG. 2 is a cross-sectional side view of the case of FIG. 1.

With reference now to the drawing figures, wherein like reference numbers represent corresponding parts throughout the several views, FIGS. 1-2 show a case 10 with a multi-layer encapsulation of design elements 32 according to an example embodiment of the invention. The case 10 defines a space or housing for receiving an electronic device such as a smartphone, e-reader, or tablet computer. The case 10 generally comprises a shell 12 including a back panel 14 which houses design elements 30 encapsulated in a plurality of layers 40, 50 to form a multi-layer section or insert. In example embodiments, the back panel comprises two layers of design elements. Each layer comprises a different design element or a different configuration of design elements.

The electronic device case 10 generally comprises a shell 12 having a back or base panel 14 and at least one peripheral sidewall or frame 16. In the depicted embodiment, the base or back panel 14 has a generally rectangular planar shape with rounded corners, configured to generally match the external geometry of the electronic device. The shell 12 is generally configured to substantially cover the back panel of the electronic device. The back panel 14 can include one or more openings or cutouts for alignment with a camera, flash unit, controls, and/or other features of the electronic device for which the case 10 is configured for use. The back panel 14 has an interior surface 18, configured to contact the back of the electronic device, and an exterior surface 20. The back panel 14 includes a recess 22 in the exterior surface 20. In example embodiments, the recess 22 has a similar shape to the back panel 14 of the case shell 12. In other embodiments, the recess 22 has an alternative shape and/or multiple recesses can be used. In example forms, the case shell 12 is formed of polycarbonate or other hard plastic, metal, composite, polymeric, ceramic, and/or other material(s) of construction.

The multi-layer encapsulation 32 comprising decorative elements 30 is generally positioned in the recess in the back panel 14 of the case shell 12. In other embodiments, the encapsulation 32 is positioned elsewhere on the case shell 12. The case 10 of the depicted embodiment comprises a first layer 40 comprising design elements of a first type 30 and a second layer 50 comprising a design element of a second type 30'. In other embodiments, the first and second layer 40, 50 can comprise design elements of the same type, but in different configurations. The first layer 40 is positioned between the bottom 24 of the recess 22 and a point between the bottom of the recess and the top 26 of the recess. The second layer 50 is positioned between the top of the first layer 40 and the top 26 of the recess 22. The layers 40, 50 can be formed from an epoxy material such as an epoxy monomer. A hardening agent or catalyst can be added to the epoxy material. In example embodiments, the layer material is substantially transparent or translucent such that the layer material is see-through. In example embodiments, one or more of the layers 40, 50 can be formed of a layer material with coloring such that the layer is translucent or opaque.

Generally, the top-most layer is formed of a transparent or translucent material. Generally, the design elements of the first type 30 and the design elements of the second type 30' are both visible on an exterior surface of the case, for example the exterior surface 20 of the back panel 14. In example embodiments, the design elements of the first type 30 and the design elements of the second type 30' are both visible on an interior surface of the case.

The design elements 30 can include glitter of a variety of shapes, beads, metallic flakes, and glow-in-the-dark elements. The design elements 30 can also include organic materials such as flowers, petals of a flower, leaves, or the like, and/or synthetic representations of such materials. The design elements 30 can be generally uniformly distributed throughout the layer. Alternatively, the design elements 30 are deliberately positioned throughout the layer. The design elements 30 can be arranged in a pattern or can be randomly positioned throughout the layer. The design elements 30 can be positioned to overlap within one layer.

In the depicted embodiment, the first layer 40 comprises a design element 30, such as metallic flake, that is uniformly distributed throughout the layer. The second layer 50 includes design elements 30' that are manually positioned throughout the layer, as discussed further below. In example embodiments, the design elements 30' of the second layer are larger than the design elements 30 of the first layer 40. In alternative embodiments, the design layers are reversed. The layers 40, 50 are generally dimensioned such that the top of the second layer 50 is substantially flush with the exterior surface 20 of the back panel 14.

FIGS. 3-4 show a case 100 with multi-layer encapsulation of design elements according to an example embodiment of the invention. The case 100 comprises a recess 122 with a multi-layer encapsulation of design elements 32 similar to the previous embodiment. In the depicted embodiment, the case shell 112 is assembled from a separate back panel 114 and the peripheral frame 116, rather than the shell being a unitary piece. The back panel 114 can be formed from a rigid material such as a hard plastic. The peripheral frame 116 generally includes a plurality of outer sidewalls surrounding a center cutout. The frame 116 can be formed from a soft, relatively flexible material, for example, thermoplastic polyurethane (TPU). The frame 116 is generally over-molded onto the front or interior surface 118 of the back panel 114.

In example embodiments, the case 100 includes slots and ribs to facilitate the coupling of the frame 116 to the back panel 114. As best shown in FIG. 4, the frame 116 includes a slot and rib 160 extending along a portion of the back surface of the frame. The slot and rib 160 in the frame 116 are configured to engage a corresponding slot and rib 162 in the back panel 114 when the frame is over-molded onto the back panel. In example embodiments, the back surface of the frame 116 includes sufficient surface area around the slot and rib to ensure adequate bonding between the two bodies during the over-molding process.

FIGS. 5-10 show steps of a manufacturing process for producing a case 10 for an electronic device having two or more layers 40, 50 of encapsulated design elements, according to an example embodiment of the invention. In the depicted embodiment, the layers 40, 50 are manufactured in the recess 22 in the case shell 12. In alternate embodiments, the multi-layer encapsulation of design elements is formed separate from the case shell, for example in a mold, and then inserted into the recess 22 in the case shell 12. The multi-layer encapsulation of design elements 32 produced external to the case shell 12 can be affixed to the case shell using permanent or semi-permanent fastening means.

FIGS. 5-6 show the manufacturing process steps 200 for producing the first layer 40 of encapsulation design elements. In example embodiments, a container with liquid epoxy monomer is mixed with design elements of a first type 30, such as metallic foil flakes or glitter, to form a generally uniform mixture 260, as shown in FIG. 5. The liquid epoxy monomer can include a hardening agent or catalyst to aid with polymerization. The epoxy mix 260 is poured into the recess 22 in the case shell 12. The epoxy polymerizes at room temperature and hardens, forming a cured epoxy layer 262 with the design elements 30 and/or other decorative design elements of the first type encapsulated therein, as shown in FIG. 6.

FIGS. 7-10 show the manufacturing process steps 202, 204, 206 for producing the second layer 50 of encapsulation design elements. The second layer 50 is generally applied to the recess 22 in the case shell 12 after the previous layer 40 has fully cured or hardened. In a first step 202, a thin layer of epoxy 264 is poured into the recess 22, as shown in FIG. 7. In example embodiments, the epoxy 264 does not include design elements. In other embodiments, the epoxy mixture can include design elements. The recess 22 then has an uncured layer of epoxy 266, as shown in FIG. 8. In the depicted embodiment, the uncured layer of epoxy 266 of the second layer 50 is positioned over and covers the first layer 40.

In a second step 204, decorative design elements of a second type 30' are arranged on top of the uncured layer of epoxy and left for a period of time to set. The recess 22 now has the second type of decorative design elements 30' held in place by the epoxy layer underneath, as shown in FIG. 9. In example embodiments, the design elements of the second type 30' are similar to the design elements of the first type 30 but are arranged in an alternative configuration. In other embodiments, the design elements of the second type 30' are different than the design elements of the first type 30. In example embodiments, the decorative design elements of the second type 30' are larger than the decorative design elements of the first type 30. In alternate embodiments, the decorative design elements of the second type 30' are smaller than the decorative design elements of the first type 30, or of approximately equal size. In still further embodiments, the first and second decorative design elements are of differing shapes, colors, configurations, patterns, materials and/or other characteristics. In particular example embodiments, the decorative design elements of the second type 30' comprise a natural or organic material such as for example flowers, petals of a flower, leaves, or the like, and/or synthetic representations of such materials. In example embodiments, the decorative design elements of the second type 30' define an irregular thickness, and the method optionally includes application and curing of one or more additional cover layers of epoxy or other polymeric material to form a smooth exterior surface. In example embodiments, the design elements of the second type 30' are positioned to overlap one another.

In a third step 206, another layer of epoxy 264 is poured on top of the second decorative design elements 30'. In example embodiments, the epoxy layer 264 is poured up to the edge of the case recess 22, and cured to produce a case with a dual-layer encapsulation of mixed decorative design elements of the first and second types visible on one or more exterior surfaces of the case, as shown in FIG. 1.

In alternate embodiments, two, three or more layers of decorative design elements may be applied in similar fashion to produce various multi-layer design configurations. In example embodiments, the first layer 40 can be created using manufacturing steps 202, 204, and 206 and the second layer 40 can be created using step 200. In still other embodiments, all layers can be created using the first layer manufacturing method (200) or all layers can be created using the second layer manufacturing method (202, 204, 206).

While the invention has been described with reference to example embodiments, it will be understood by those skilled in the art that a variety of modifications, additions, and deletions are within the scope of the invention, as defined by the following claims. For example, the multi-layer encapsulation of design elements can be applied to products other than electronic device cases.

What is claimed is:

1. A case for an electronic device comprising:
a case shell comprising a back panel and a peripheral frame portion configured to be installed onto the electronic device, the back panel having an interior side and an exterior side; and
first and second design elements applied to the back panel of the case shell and visible at least from the exterior side thereof, the first design elements being different from the second design elements;
wherein the first and second design elements are applied in a recess in the back panel, and covered with a substantially transparent encapsulation material; and
wherein the first design elements and the second design elements are separately encapsulated with the encapsulation material in first and second layers within the recess.

2. The case of claim 1, wherein the first design elements comprise an inorganic material, and wherein the second design elements comprise a natural or synthetic organic plant material.

3. The case of claim 2, wherein the inorganic material of the first design elements comprises metallic flakes or glitter.

4. The case of claim 2, wherein the natural or synthetic organic plant material of the second design elements comprises flowers.

5. The case of claim 1, wherein the second design elements are larger than the first design elements.

6. The case of claim 1, wherein the encapsulation material comprises a polymerizable epoxy.

7. The case of claim 1, wherein the back panel of the case shell comprises a transparent polycarbonate material.

8. The case of claim 1, wherein the first and second design elements are also visible from the interior side of the back panel.

9. The case of claim 1, wherein the peripheral frame portion of the case shell comprises a flexible thermoplastic polyurethane material overmolded onto the back panel of the case shell.

10. The case of claim 1, wherein the second design elements are positioned exterior to the first design elements.

11. The case of claim 1, wherein the first design elements comprise metallic foil flakes.

12. The case of claim 1, wherein the second design elements comprise natural or organic materials including one or more of flowers, petals of a flower, leaves, or the like, or synthetic representations of such materials, and combinations thereof.

* * * * *